US009148896B2

(12) United States Patent
Morel et al.

(10) Patent No.: US 9,148,896 B2
(45) Date of Patent: Sep. 29, 2015

(54) METHOD FOR ESTABLISHING A TWO-WAY IP COMMUNICATION CHANNEL IN A TELECOMMUNICATIONS NETWORK

(75) Inventors: Didier Morel, Marseilles (FR); Cyril Barras, Saint Maximin la Ste Baume (FR); Jean-Yves Fine, Marseilles (FR); Ly-Thanh Phan, Le Plessis Robinson (FR)

(73) Assignee: GEMALTO SA, Meudon (FR)

( * ) Notice: Subject to any disclaimer, the term of this patent is extended or adjusted under 35 U.S.C. 154(b) by 255 days.

(21) Appl. No.: 13/979,111

(22) PCT Filed: Jan. 12, 2012

(86) PCT No.: PCT/EP2012/050404
§ 371 (c)(1),
(2), (4) Date: Dec. 27, 2013

(87) PCT Pub. No.: WO2012/095474
PCT Pub. Date: Jul. 19, 2012

(65) Prior Publication Data
US 2014/0119355 A1 May 1, 2014

(30) Foreign Application Priority Data
Jan. 12, 2011 (EP) ..................................... 11305028

(51) Int. Cl.
*H04W 76/02* (2009.01)
*H04W 8/26* (2009.01)
*H04W 74/00* (2009.01)
*H04W 4/00* (2009.01)

(52) U.S. Cl.
CPC ................ *H04W 76/02* (2013.01); *H04W 8/26* (2013.01); *H04W 4/001* (2013.01); *H04W 74/004* (2013.01)

(58) Field of Classification Search
None
See application file for complete search history.

(56) References Cited

U.S. PATENT DOCUMENTS

2008/0101278 A1* 5/2008 Bengtsson et al. ............ 370/328
2009/0119364 A1 5/2009 Guillon
2011/0294475 A1 12/2011 Hugot et al.

FOREIGN PATENT DOCUMENTS

EP 2 219 346 A1 8/2010

OTHER PUBLICATIONS

International Search Report (PCT/ISA/210) issued on Apr. 5, 2012, by the European Patent Office as the International Searching Authority for International Application No. PCT/EP2012/050404.
Written Opinion (PCT/ISA/237) issued on Apr. 5, 2012, by the European Patent Office as the International Searching Authority for International Application No. PCT/EP2012/050404.

* cited by examiner

*Primary Examiner* — Ian N Moore
*Assistant Examiner* — Brian T Le
(74) *Attorney, Agent, or Firm* — Buchanan Ingersoll & Rooney PC

(57) ABSTRACT

A method for establishing a communication channel between a local server and a remote server includes: i) transmitting, from the local server to a terminal, the IP address of the remote server and a communication port of the local server; ii) transmitting the IP address of the terminal from the terminal to the local server; iii) transmitting, from the local server to the terminal, a request to connect to the remote server, including the IP addresses of the remote server and the terminal, an identifier of the local server; and the communication port; iv) transmitting, from the local server to the remote server, the IP address of the terminal, an identifier of the local server, and the communication port; and v) combining, at the remote server, the identifier of the local server and the IP address of the terminal to ascertain an IP address of the local server.

5 Claims, 1 Drawing Sheet

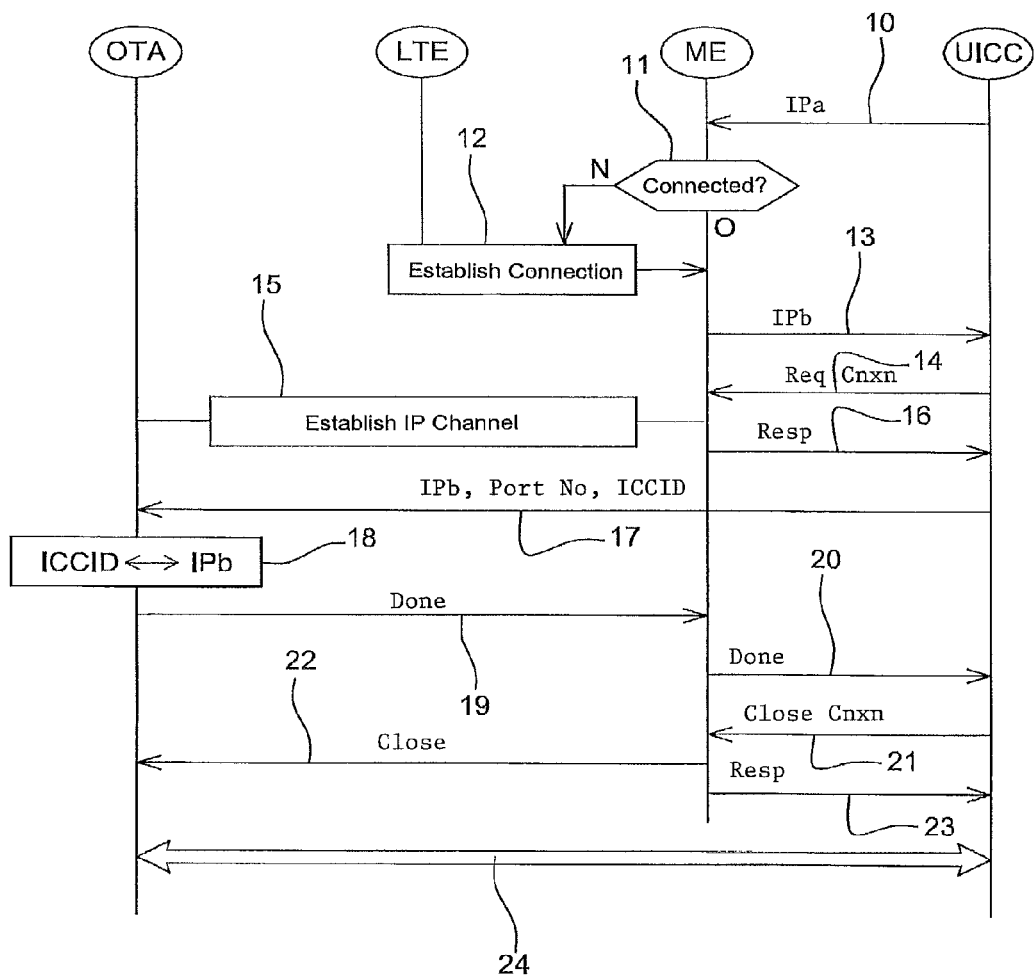

METHOD FOR ESTABLISHING A TWO-WAY IP COMMUNICATION CHANNEL IN A TELECOMMUNICATIONS NETWORK

The field of the invention is that of telecommunications within cellular networks and more precisely relates to a method for establishing a two-way IP communication channel between a local server, reachable via an IP connection of a terminal, and a remote server.

The local server is for example a Smart Card Web Server integrated within a chip card (SIM) making it possible for a person using a mobile terminal to have access to Internet services. The chip card is for example a UICC (Universal Integrated Circuit Card) which can be inserted into a terminal or fixedly integrated therein or provided with a local communication channel connected therewith.

In the telecommunications networks up to the third generation, a remote server, for example an OTA (Over The Air) platform can have access to a UICC, for example to update data. Such access is conventionally performed by emitting special SMS messages.

In the fourth generation networks, such as the LTE (Long Term Evolution) network, for example, communications are made as IP packets and the SMS channel no longer exists.

The present invention provides for a mechanism making it possible to have a secure access, through a remote server, to a UICC reachable via an IP connection of a terminal, while knowing only the IP address of such terminal. As a matter of fact, the UICC is for example a card included in the terminal (a cell phone, a computer or a machine) and the remote server is an OTA server operating an operator's network to download data into the UICC or read data which are stored therein.

The method according to the invention consists in:

i) transmitting, from the local server to the terminal, the IP address of the remote server and a communication port number of the local server;

ii) after establishing an IP connection between the network and the terminal, transmitting the IP address of the terminal from the terminal to the local server;

iii) transmitting, from the local server to the terminal, a request to connect to the remove server, said request including:
  the IP address of the remote server,
  the IP address of the terminal,
  an identifier of the local server;
  the communication port number of the local server;

iv) after establishing the IP communication channel between the terminal and the remote server, transmitting, from the local server to the remote server:
  the IP address of the terminal,
  an identifier of the local server,
  the communication port number of the local server;

v) combining, at the remote server, the identifier of the local server and the IP address of the terminal such that the remote server can ascertain the IP address, within the network, to which the remote server can link the local server.

Thus, the local server (for example located in a UICC) which knows the IP address of the remote server triggers the establishment of a communication channel by providing the remote server with all the elements making it possible for same to be addressed (address of the terminal which the local server cooperates with and port number). A two-way IP communication channel is thus established between the local server and the remote server.

The step ii preferably consists in connecting the terminal to the network and in transmitting the IP address of the terminal to the local server.

The local server is advantageously aboard a UICC.

Preferably the UICC is included within the terminal.

The invention advantageously applies to a packet switching network such as an LTE network.

Other characteristics and advantages of the invention will appear when reading the following description of an advantageous embodiment given as an illustrative but not restrictive example, and the single FIGURE appended therewith, which shows the mechanism for establishing a two-way IP communication channel between a local server and a remote server.

Four entities operate for establishing such communication channel: a UICC including a local server (SCWS) or any other element comprising a local server reachable via an IP connection from a terminal, with the ME terminal proper (which may include such UICC for example), the telecommunications network (for example an LTE network) and a remote server, for example composed of an OTA platform.

The local server or the UICC knows the IP address, called the IPa, of the remote server OTA, authorized to have access to the UICC. During the step of starting the UICC (booting phase), the latter transmits the IPa address and the communication port number of its local server to the ME terminal, during a step 10. Such transmission may occur for example as:

BIP Open Channel (UICC Remote Server Mode [IPa, port number])

Step 11 checks whether the ME terminal is already connected or not to the LTE network. If not so (N), the ME terminal connects to the LTE network (step 12) and an IPb address is transmitted thereto. If it is already connected to the LTE network, the terminal already knows this IPb address and can transmit it to the UICC during a step 13. Such transmission may occur as a Terminal Response (IPb).

The UICC server port is then accessible from the outside by the remote server, with the ME terminal being able to filter the external requests for access so as not to authorize access to the local server but to the remote server identified by the IPa address.

The UICC local server then transmits a request to connect to the OTA remote server, to the terminal ME, during a step 14.

This request may have the following form:

Open Channel (Client's BIP [IPa, IPb, ICCID, port number]

i.e. it contains the IPa address of the remote server, the IPb address of said terminal, an identifier of the local server (here the ICCID of the UICC card, which is the serial number thereof), and the communication port number of the local server.

During step 15, an IP communication channel is thus established between the ME terminal and the OTA remote server and the ME terminal can inform the UICC through a "Terminal Response" answer, during a step 16.

During a step 17, the local server transmits the IP address of the ME terminal, the identifier of the local server and the communication port number of the local server to the remote server.

Such request may have the following form:

Send Data (IPb, port number, ICCID)

During a step 18, the OTA remote server dynamically combines the ICCID identifier of the local server and IPb address of the ME terminal such that the OTA remote server can ascertain the IP address, within the network to which the remote server can link the local server.

During the optional steps 19 to 23, the OTA remote server can inform the ME terminal that the operation was correctly executed (step 19), the terminal informs the local server thereof (step 20), the local server requests the ME terminal to close the connection thereof with the OTA remote server (step 21) and, upon closing such channel (step 22), the ME terminal inform the local server thereof (step 23).

During a step 24, the local server and the remote server are connected to each other and can exchange data or programs via the ME terminal. Downloading data or programs into the UICC from the remote OTA server is thus possible. When exchanges are completed, the channel is closed.

As mentioned above, the local server is preferably aboard a UICC. Then it is a Smart Card Web Server.

The UICC may conventionally be included in the terminal, either fixedly or removeably, or dialogue with the terminal through a short range link, for example of the eGo type, such as described in the Internet site http://www.ego-project.eu, or through a Bluetooth or Wifi connection.

The invention claimed is:

1. A method for establishing a two-way IP communication channel in a telecommunications network between a local server, reachable via an IP connection of a terminal, and a remote server, comprising:
   i) transmitting, from said local server to said terminal, an IP address of said remote server and a communication port number of said local server;
   ii) after establishing said IP connection between said telecommunications network and said terminal, transmitting an IP address of said terminal from said terminal to said local server;
   iii) transmitting, from said local server to said terminal, a request to connect to said remote server, said request including:
      the IP address of said remote server,
      the IP address of said terminal,
      an identifier of said local server; and
      said communication port number of said local server;
   iv) after establishing a first IP communication channel between said terminal and said remote server, transmitting, from said local server to said remote server:
      the IP address of said terminal,
      the identifier of said local server, and
      said communication port number of said local server;
   v) combining, at said remote server, said identifier of said local server and the IP address of said terminal in order to ascertain the IP address of said terminal, within the telecommunications network, by which said remote server links to said local server.

2. The method according to claim 1, wherein step (ii) comprises connecting said terminal to said telecommunications network and transmitting the IP address of said terminal to said local server.

3. The method according to claim 1, wherein said local server is aboard a universal integrated circuit card (UICC).

4. The method according to claim 3, wherein said UICC is included within said terminal.

5. The method according to claim 1, wherein said telecommunications network is an LTE network.

* * * * *